United States Patent
Burek et al.

(10) Patent No.: US 9,874,712 B2
(45) Date of Patent: Jan. 23, 2018

(54) MODULE FOR OPTICAL FIBER INSTALLATION AND STORAGE AT CUSTOMER PREMISES

(71) Applicant: OFS Fitel, LLC, Norcross, GA (US)

(72) Inventors: Denis E Burek, Cumming, GA (US); Willard C White, Suwanee, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/257,248

(22) Filed: Sep. 6, 2016

(65) Prior Publication Data
US 2017/0357072 A1    Dec. 14, 2017

Related U.S. Application Data

(60) Provisional application No. 62/347,711, filed on Jun. 9, 2016.

(51) Int. Cl.
*G02B 6/44*    (2006.01)
*G02B 6/38*    (2006.01)

(52) U.S. Cl.
CPC ......... *G02B 6/4457* (2013.01); *G02B 6/3897* (2013.01); *G02B 6/4446* (2013.01)

(58) Field of Classification Search
CPC .. G02B 6/4457; G02B 6/3897; G02B 6/4446; G02B 6/46; G02B 6/4441; G02B 6/4471; G02B 6/445; G02B 6/4452; G02B 6/4453
See application file for complete search history.

(56) References Cited

U.S. PATENT DOCUMENTS

| | | | | |
|---|---|---|---|---|
| 5,228,631 A | * | 7/1993 | Hu | B65H 54/10 242/159 |
| 6,533,216 B1 | * | 3/2003 | Bumgarner | B65H 75/14 242/118.41 |
| 8,074,916 B2 | * | 12/2011 | Penumatcha | B65H 75/14 242/604 |
| 8,818,157 B2 | | 8/2014 | Burek et al. | |
| 8,906,178 B2 | | 12/2014 | Burek et al. | |

(Continued)

FOREIGN PATENT DOCUMENTS

WO    2015/0145055 A    10/2015

OTHER PUBLICATIONS

OFS, Shuttered Adapter Invisilight(tm) Module, Product Description, two pages (2015).

*Primary Examiner* — Ryan Lepisto
*Assistant Examiner* — Erin Chiem
(74) *Attorney, Agent, or Firm* — Leo Zuckee, Esq.

(57) ABSTRACT

A module for installing and storing an optical fiber includes a supply spool containing fiber for routing between the module and a service module at a customer premises. An adapter inside the module connects the fiber on the spool with an outside connector associated with a device at the premises. A wall of the module has a payout opening, and an edge of the module base is set back from the outside surface of the wall at the payout opening. A ramp area formed on the base inclines downward from the spool toward the payout opening. A lower edge of the ramp area substantially coincides with the setback edge and is substantially flush with a supporting surface beneath the base. Fiber drawn from the module can be adhered to the supporting surface at the payout opening and thus ameliorate any adverse visual impact of the fiber near the module.

19 Claims, 4 Drawing Sheets

(56) References Cited

U.S. PATENT DOCUMENTS

2008/0131132 A1\* 6/2008 Solheid ................ G02B 6/4441
 398/117
2014/0161411 A1\* 6/2014 Slater ................... G02B 6/4471
 385/135

\* cited by examiner

MODULE FOR OPTICAL FIBER INSTALLATION AND STORAGE AT CUSTOMER PREMISES

CROSS REFERENCE TO RELATED APPLICATION

This application claims priority under 35 U.S.C. § 119(e) of U.S. Provisional Patent Application No. 62/347,711 filed Jun. 9, 2016, titled "Alternative Route Solutions for Routing InvisiLight® Optical Fiber," the entire contents of which are incorporated by reference.

BACKGROUND OF THE INVENTION

Field of the Invention

The present invention relates to enclosures or modules for storing optical fibers and cables at customer premises.

Discussion of the Known Art

The deployment of desktop optical network terminals (ONTs) at premises of network users is increasing. ONTs can be conveniently located, for example, near a TV set top box, an Internet modem, or other telecommunications device served by the network. An optical fiber is routed at the premises to connect the ONT to a service module that is typically installed at an entrance to the premises by the network provider. The fiber routing at the premises should be performed at minimal cost and with little visibility, if any, to occupants when completed.

Wire staples may be used to fasten an optical fiber to a wall, molding, or other supporting surface over a determined routing path at the premises quickly and at low cost. Notwithstanding, customers often prefer to keep fibers and cables that are routed inside their premises completely hidden from view by using special moldings or conduits. Also, if not carefully inserted, staples can physically damage the supporting surface and impair or break an optical fiber as well. Therefore, for customers who want to hide all fibers and cables routed at their premises from view, expensive hardware and additional installation time are required.

A procedure that allows an installer to route and bond an optical fiber or cable over exposed surfaces, grooves, and/or corners at customer premises quickly and safely, and with little or no permanent visual impact, is therefore very desirable. Materials and instructions for performing such a procedure are available from OFS Fitel, LLC, under the registered mark InvisiLight. See U.S. Pat. No. 8,906,178 (Dec. 9, 2014) and U.S. Pub. No. 2016/0097911 (Apr. 7, 2016), both of which are incorporated by reference. During an InvisiLight installation, a consumer grade, low odor, nonhazardous, water based adhesive is used to bond buffered fibers or jacketed indoor cables to walls, ceilings, and other surfaces along a determined routing path at the premises. Water based adhesives are preferable since they can be applied in areas that lack ventilation, cleaned up with soap and water, and shipped worldwide without restrictions.

Known procedures for routing a fiber inside a home or multiple dwelling building usually require the installer to bond the fiber to supporting surfaces over the routing path while the fiber is simultaneously unwound from a supply spool. The installer typically starts the routing from a provider service module located near an entrance to the premises, and ends at a termination point inside the premises, e.g., a fiber storage module mounted in the vicinity of an ONT. See U.S. Pat. No. 8,818,157 (Aug. 26, 2014), which is assigned to the assignee of the present invention and incorporated by reference, and discloses an optical fiber storage module configured so that after a length of fiber has been unwound from a supply spool after routing at the premises, the spool and any remaining fiber thereon can be mounted and enclosed inside the module for storage.

It is sometimes more expedient for an installer to reverse the above procedure by starting the fiber routing at the termination point (e.g., the ONT) inside the premises, and ending at the provider service module near the premises entrance. In such cases, it is convenient to keep the fiber supply spool mounted inside the storage module, and allow the spool to rotate as a length of fiber needed for the entire installation is drawn at once from a payout area of the module. See WO 2015/0145055 (Oct. 1, 2015) which is incorporated by reference. While being drawn, it is important that the fiber not be snagged or bend critically as it unwinds from the spool and is guided toward and out of the payout area. For the mentioned InvisiLight fiber installations, it is also desirable for the fiber be adhered to a supporting surface at and beneath the payout area of the module, thereby avoiding or reducing any adverse visual impact of the routed fiber near the module.

SUMMARY OF THE INVENTION

According to the invention, a module for optical fiber installation and storage has a body including a base, and a wall surrounding the periphery of the base. A fiber supply spool mounted inside the module includes a hub, a lower flange, and an upper flange. The hub and the flanges form a winding section for containing a length of fiber to be routed between the storage module and a provider service module associated with the premises where the storage module is deployed. A connector adapter in the module body has a proximal end for connecting to a mating connector at one end of a fiber wound on the spool, and a distal end for connecting to an outside connector associated with an optical device (e.g., an ONT) at the premises.

A payout area of the module body has a fiber payout opening formed in the wall of the body, and an edge of the base of the body is set back a certain distance from the outside surface of the wall at the payout opening. A ramp area on the base is formed to incline downward from the spool toward the payout opening, and a lower edge of the ramp area coincides with the set back edge and is substantially flush with a supporting surface beneath the base. Thus, fiber drawn from the module can be adhered directly to the supporting surface at the payout opening to avoid or reduce any adverse visual impact of the fiber near the module at the premises.

For a better understanding of the invention, reference is made to the following description taken in conjunction with the accompanying drawing and the appended claims.

BRIEF DESCRIPTION OF THE DRAWING FIGURES

DETAILED DESCRIPTION OF THE INVENTION

As used herein, the terms "user" and "customer" are used inter-changeably to mean a natural person or a legal entity that uses telecommunication services offered by a network provider including, e.g., Internet access, telephony, television, or other information or data streams wherein the services require the installation of one or more optical fibers or cables at a location where the services are used by the person or entity (e.g., private home, apartment, or office). Further, the words "premises," "home," and "residence" are used interchangeably to mean the home, office, or other living unit where the services are provided for use by the person or entity.

Figure 1:
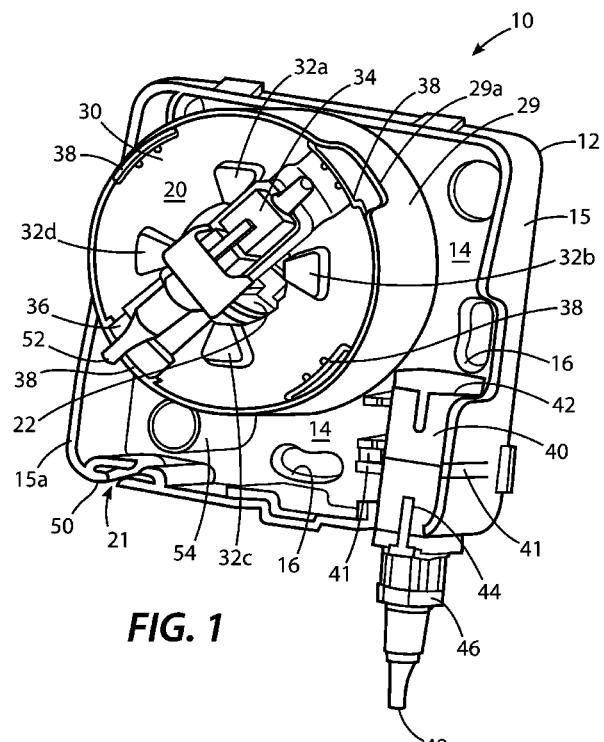
FIG. 1 is an isometric view of an optical fiber storage module according to the invention, showing interior components of the module.

FIG. 1 is an interior view of an optical fiber storage module 10 according to the invention. In the illustrated embodiment, the module 10 has a generally square body 12 measuring approximately 3 inches by 3 inches (76.3 mm by 76.3 mm), and is made of polypropylene copolymer or equivalent material that meets all applicable fire and smoke safety codes. The module body 12 has a base 14 and a surrounding wall 15. The base 14 has several fastener openings 16 so that the module 10 can be mounted on a wall or other supporting surface at a user premises. The thickness of the base 14 and the wall 15 may be approximately 0.068 inch each.

Figure 2:
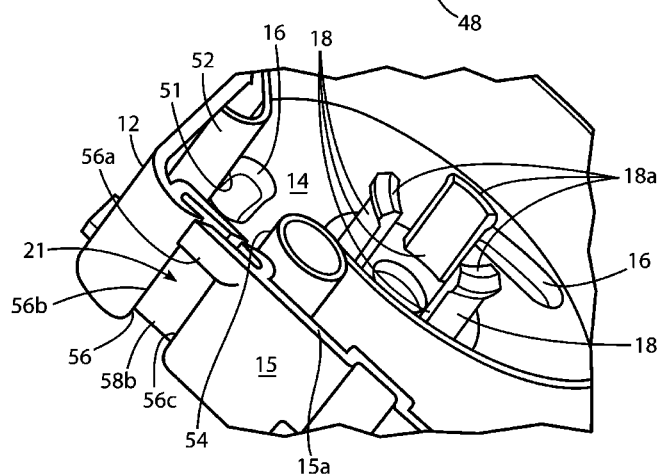
FIG. 2 is a view of a fiber payout area of the module in FIG. 1.

As seen more clearly in FIG. 2, a set of three arcuate retention members 18 project vertically upward in equi-circumferentially spaced relation from the base 14. The retention members 18 have lips 18a that protrude radially outward from the free ends of the members, and the members are configured to mount and retain a fiber supply spool 20 shown in FIGS. 1, 3, 5, and 6. The retention members 18 also allow the mounted spool 20 to rotate about them when a fiber is unwound from the spool for installation at the user premises. To comply with the fire and smoke safety codes, the spool 20 may be made from an alloy of polycarbonate and ABS (e.g., Wonderloy® PC-510) or equivalent material.

Figure 5:
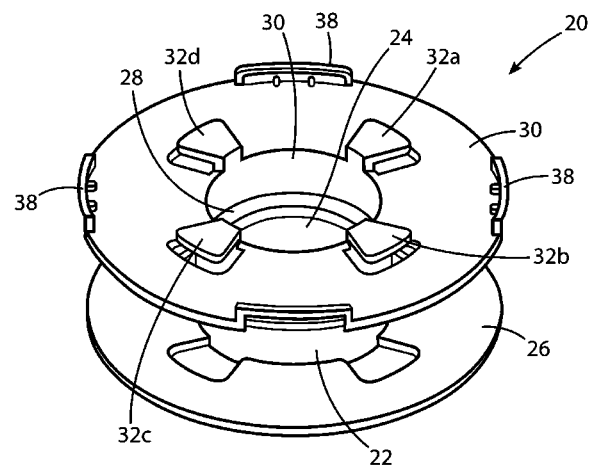
FIG. 5 is an isometric view of the fiber supply spool.
Figure 6:
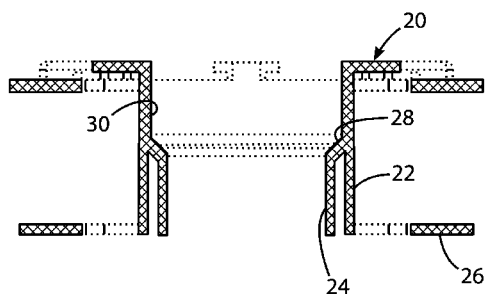
FIG. 6 is a cross sectional view of the supply spool in FIG. 5 in a plane coincident with the spool axis.

The spool 20 includes a hub 22 having a lower, reduced diameter portion 24 shown in FIGS. 5 and 6, and an annular step 28 is formed between the reduced diameter portion 24 and an upper portion 30 of the hub 22. When a lower flange 26 of the spool 20 is centered over the retention members 18 and the spool is urged onto the members, the lips 18a at the ends of the members enter the reduced diameter portion 24 of the hub and deflect toward one another. When the lips 18a are at the top of the reduced diameter portion 24, they diverge radially onto the annular step 28 and act to retain the spool 20 in a mounted position at which the spool 20 can rotate about the retention members. To ensure the spool 20 rotates smoothly and stays concentric with the retention members 18 when fiber is unwound, a circular cylindrical wall 29 is formed on the module base 14 to surround and contain the spool. The diameter of the wall 29 preferably clears the outer periphery of the mounted spool 20 by a radial gap of only about 0.0075 inch (0.19 mm). One or more cutouts 29a are formed along the top edge of the wall 29 to facilitate mounting and removal of the spool 20 by hand.

In the present embodiment, the lower flange 26 and an upper flange 30 of the spool 20 have an outer diameter of approximately 2 inches each, and the height of the spool hub 22 is about 0.625 inch. The lower and the upper flanges 26, 30, and the hub 22 together form a first winding section of the spool 20 in which up to about 30 meters of a buffered optical fiber can be wound for supply. As seen in FIGS. 1 and 5, a set of four equi-circumferentially spaced flat retaining ears or guides 32a-d extend radially outward from the spool hub 22, parallel to the upper flange 30 and spaced approximately 0.040 inch from the flange 30. The retaining guides 32a-d and the upper flange 30 together form a second winding section of the spool 20 in which several turns of fiber can be wound before the remaining length of fiber is wound in the first winding section of the spool.

As seen in FIG. 1, a free end of fiber wound in the second winding section of the spool 20 is terminated in a connector 34 (e.g., type SC). In the illustrated embodiment, the connector 34 is retained temporarily on the upper flange 30 of the spool by an elongated holder 36, and opposite ends of the holder 36 are secured in raised ears 38 on the circumference of the flange 30. The spool 20 can therefore be pre-wound with a single length of fiber several turns of which are wound in the second winding section and are terminated in the connector 34 in FIG. 1, and remaining turns of which are wound in the first winding section and terminated in another connector for connection to the network provider service module at the premises.

Figure 3:
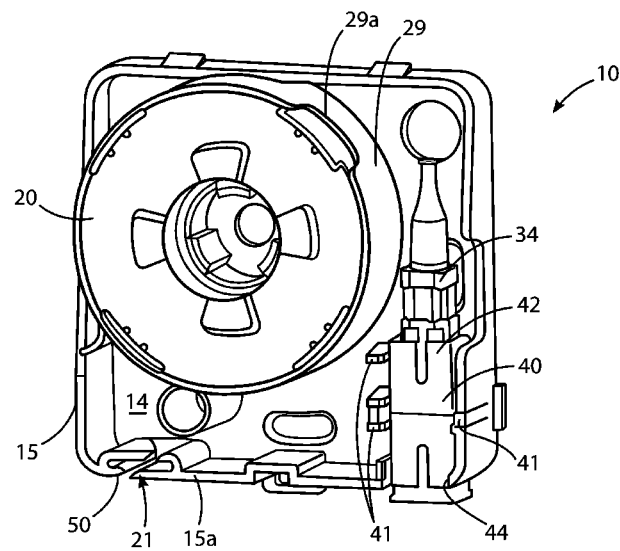
FIG. 3 is a view similar to FIG. 1, in which an optical connector mounted atop a fiber supply spool in FIG. 1 is mated to a connector adapter retained in the module.
Figure 4:
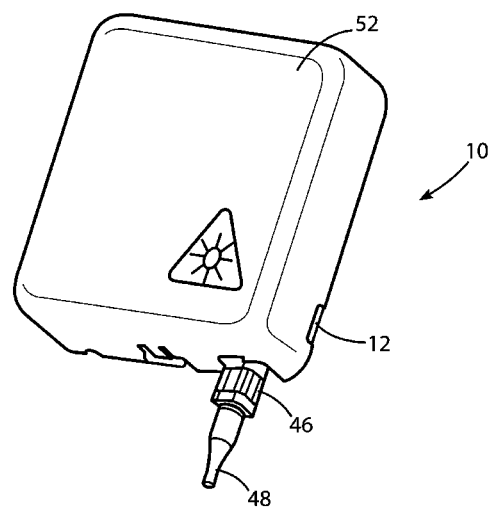
FIG. 4 is a view of the module in FIG. 1 when enclosed by a module cover.

The module 10 also houses a connector adapter 40 (e.g., type SC) that is seated within retaining guides 41 that project from the module base 14 and wall 15. See FIGS. 1 and 3. As shown in FIG. 3, a proximal end 42 of the adapter 40 is configured to mate with the connector 34 that terminates the fiber wound in the second winding section of the spool 20, after the connector 34 is removed from the holder 36 atop the spool 20 in FIG. 1. A distal end 44 of the adapter 40 is exposed through the module wall 15 to mate with an outside connector 46 that terminates one end of a jumper cable 48 leading to, e.g., an ONT or other optical device at the premises. See FIG. 4.

Before the connector 34 is mated to the proximal end 42 of the adapter 40, an installer determines the best routing path along which a fiber is to be installed between the storage module 10 and the provider service module at the premises. An end length of the fiber in the first winding section on the spool 20 is retrieved and threaded downward through a narrow slot 50 in a top edge 15a of the module wall 15 to enter a payout area 21 of the module. The required length of fiber is then drawn from the first winding section of the spool 20 through the payout area 21 as explained below with respect to FIGS. 2, 7, and 8. After the required length of fiber is drawn, the connector 34 is removed from its holder 36 atop the spool 20. Enough fiber is unwound from the second winding section of the spool to allow the connector 34 to engage the proximal end 42 of the adapter 40 without causing the fiber to break or critically bend. The module 10 including the spool 20 and the adapter 40 are enclosed by a cover 52 that snaps or otherwise fastens onto the module body 12. See FIG. 4.

Figure 7:
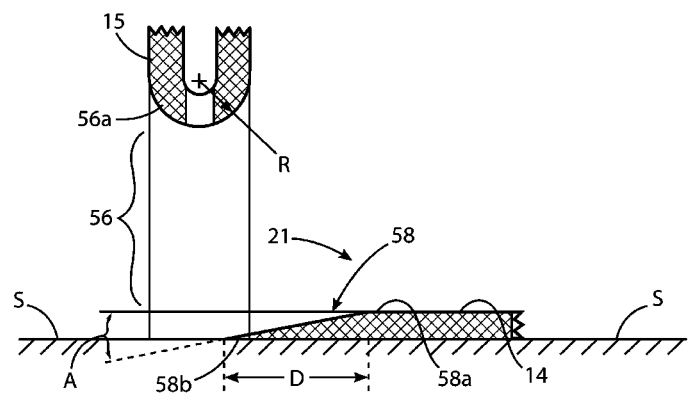
FIG. 7 is an enlarged, cross-sectional view of the fiber payout area in FIG. 2.
Figure 8:
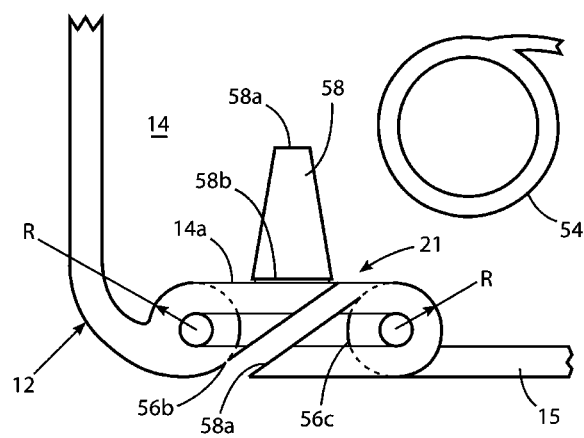
FIG. 8 is an enlarged, top view of the fiber payout area in FIG. 2.

FIGS. 2, 7, and 8 show details of the fiber payout area 21 of the module 10. In the illustrated embodiment, it is assumed that fiber is wound on the spool 20 in such a direction so that when the fiber is drawn through the payout area 21 of the module, the spool rotates counterclockwise as viewed in FIG. 1. As seen in FIG. 2, the cylindrical wall 29 that surrounds the spool 20 forms a circumferential gap 51 through which the fiber is guided when unwound from the spool, and the sides of the gap 51 are rounded at 52, 54.

At the module payout area 21, a rectangular fiber payout opening 56 is formed in the wall 15 of the module body 12. The opening 56 is bound by a top edge 56a, and left and right side edges 56b, 56c of the wall 15 as viewed in FIGS. 2 and 8. The side edges 56b, 56c are spaced apart by approximately 0.239 inch (6.07 mm), and all three edges 56a-c are rounded with a radius of curvature R of not less than a minimum bend radius specified for fiber supplied from the spool 20, for example, R=0.100 inch (2.54 mm) or greater. Accordingly, the fiber will not be snagged or bend critically when drawn out of the module 10 in a direction from the left, the right, or above the module payout opening 56.

As shown in FIG. 8, an approximately 0.400 inch (10.16 mm) wide edge 14a of the base 14 of the module body 12 is set back by a distance of, e.g., about 0.200 inch (5.08 mm) from the outside surface of the wall 15 of the body 12 at the payout area 21. A trapezoidal shaped area 58 is extruded or cut into the base 14 such that the area 58 ramps downward at an angle A of about 8.25 degrees over a horizontal distance D of about 0.400 inch (10.16 mm) between an upper edge 58a of the area 58, and a lower edge 58b of the area that substantially coincides with the set back edge 14a of the base 14. The lower edge 58b of the area 58 is rounded and substantially flush with a supporting surface S beneath the base. See FIG. 7. The width of the upper edge 58a of the area 58 is, e.g., about 0.159 inch (4.04 mm), and the width of the lower edge 58b is, e.g., about 0.239 inch (6.07 mm).

The area 58 on the base 14 provides a gradual downward ramp for fiber traveling from the supply spool 20 toward the payout area 21 of the module when fiber is drawn out of the payout opening 56. Because the lower edge 58b of the area 58 is substantially flush with the supporting surface S, the drawn fiber can be adhered directly to the surface S beneath the base 14 at the payout opening 56, thus minimizing or avoiding any adverse visual impact of the fiber near the module 10 at the premises.

While the foregoing represents preferred embodiments of the present invention, it will be understood by persons skilled in the art that various changes, modifications, and additions can be made without departing from the spirit and scope of the invention, and that the invention includes all such changes, modifications, and additions that are within the scope of the following claims.

We claim:

1. A module for optical fiber installation and storage at customer premises, comprising:
    a module body including a base, and a wall surrounding the periphery of the base;
    a fiber supply spool including a hub, a lower flange at a first axial end of the hub, and an upper flange at a second axial end of the hub opposite the first axial end, wherein the hub, the lower flange, and the upper flange define a first winding section of the spool for containing a length of fiber sufficient to route between the module and a provider service module associated with a customer premises at which the module is deployed;
    a connector adapter mounted in the module body, wherein a proximal end of the adapter is configured to connect with a mating connector at one end of a fiber contained on the spool, and a distal end of the adapter is configured to connect with an outside connector associated with an optical device at the premises;
    a payout area of the module body has a fiber payout opening formed in the wall of the body, and a set back edge of the base of the body is set back a certain distance from the outside surface of the wall at the payout area;
    a ramp area is formed on the base for providing a downward incline for fiber traveling from the supply spool toward the payout area when drawn from the payout opening, and a lower edge of the ramp area substantially coincides with the set back edge of the base and is substantially flush with a supporting surface beneath the base so that fiber drawn from the spool can be adhered to the supporting surface beneath the base at the payout opening, thus avoiding or minimizing any adverse visual impact of the fiber near the module at the premises.

2. A module for optical fiber according to claim 1, wherein the ramp area on the base is trapezoidal in shape.

3. A module for optical fiber according to claim 1, wherein the upper edge and the lower edge of the ramp area on the base are spaced apart by a horizontal distance of about 0.400 inch (10.16 mm).

4. A module for optical fiber according to claim 1, wherein the upper edge of the ramp area on the base is about 0.159 inch (4.04 mm) wide, and the lower edge of the ramp area is about 0.239 inch (6.07 mm) wide.

5. A module according to claim 1, wherein the ramp area on the base is inclined at an angle of about 8.25 degrees.

6. A module according to claim 1, wherein the set back edge of the base of the module body is approximately 0.400 inch (10.16 mm) wide.

7. A module according to claim 1, wherein the set back edge of the base of the module body is set back from the outside surface of the wall of the module body by about 0.2 inch (5.08 mm).

8. A module according to claim 1, wherein the fiber payout opening is bound by a top edge, a left side edge, and a right side edge of the wall of the module body, and said edges have a radius of curvature of not less than a minimum bend radius specified for fiber wound on the supply spool.

9. A module according to claim 1, wherein the upper flange of the fiber supply spool has a set of equi-circumferentially spaced retaining guides that extend radially outward from the hub, and the retaining guides and the upper flange form a second winding section of the spool for containing a length of fiber sufficient to connect from the spool to the proximal end of the connector adapter when the spool is mounted in the module.

10. A module according to claim 1, comprising:
    a set of arcuate retention members projecting upward in circumferentially spaced relation from the base of the module body, and the retention members have lips that protrude radially outward from free ends of the members; and
    the hub of the supply spool has a lower reduced diameter portion, and an annular step is formed between the reduced diameter portion and an upper portion of the hub so that when the spool is urged onto the retention members, the lips at the ends of the members enter the reduced diameter portion of the hub and deflect toward one another, and when the lips are at the top of the reduced diameter portion, the lips diverge radially onto the annular step and retain the spool in a mounted position at which the spool can rotate about the retention members.

11. A module according to claim 1, including a circular cylindrical wall extending from the base of the module body for surrounding the fiber supply spool so that the spool remains substantially concentric with the retention members when fiber is drawn from the spool and the spool rotates about the retention members.

12. A module according to claim 11, wherein one or more cutouts are formed along a top edge of the cylindrical wall to facilitate manual insertion and removal of the supply spool.

13. A module according to claim 1, including a removable cover for enclosing the body of the module including the supply spool and the connector adapter.

14. A module according to claim 1, wherein the supply spool contains a length of fiber sufficient to route between the module and a provider service module associated with a customer premises at which the module is deployed.

15. A module according to claim 9, including an end length of fiber wound in the second winding section of the fiber supply spool, and a connector that terminates the end length of fiber, wherein the connector is configured to connect to the proximal end of the connector adapter.

16. A module according to claim 15, including a holder constructed and arranged for temporarily retaining the connector on the upper flange of the fiber supply spool.

17. A module according to claim 8, wherein the side edges of the payout opening are spaced apart by approximately 0.239 inch (6.07 mm).

18. A module according to claim 8, wherein the radius of curvature of each of the edges of the payout opening is about 0.100 inch (2.54 mm).

19. A module according to claim 8, wherein the top edge of the payout opening has a slot through which an end length of fiber on the supply spool can be threaded to enter the payout opening.

\* \* \* \* \*